(12) United States Patent
Kimura et al.

(10) Patent No.: US 12,385,541 B2
(45) Date of Patent: Aug. 12, 2025

(54) DISC BRAKE PAD

(71) Applicant: NISSHINBO BRAKE, INC., Tokyo (JP)

(72) Inventors: Eiji Kimura, Gunma-ken (JP); Mitsuaki Yaguchi, Gunma-ken (JP); Yasuki Hattori, Gunma-ken (JP)

(73) Assignee: NISSHINBO BRAKE, INC., Tokyo (JP)

( * ) Notice: Subject to any disclaimer, the term of this patent is extended or adjusted under 35 U.S.C. 154(b) by 597 days.

(21) Appl. No.: 17/765,837

(22) PCT Filed: Sep. 28, 2020

(86) PCT No.: PCT/JP2020/036627
§ 371 (c)(1),
(2) Date: Mar. 31, 2022

(87) PCT Pub. No.: WO2021/065797
PCT Pub. Date: Apr. 8, 2021

(65) Prior Publication Data
US 2022/0373052 A1 Nov. 24, 2022

(30) Foreign Application Priority Data
Oct. 3, 2019 (JP) .................. 2019-183086

(51) Int. Cl.
*F16D 69/02* (2006.01)
*F16D 65/092* (2006.01)
(52) U.S. Cl.
CPC ........... *F16D 69/02* (2013.01); *F16D 65/092* (2013.01); *F16D 2250/0038* (2013.01)
(58) Field of Classification Search
CPC . F16D 69/02; F16D 65/092; Y10T 428/24942
See application file for complete search history.

(56) References Cited

U.S. PATENT DOCUMENTS 5,693,402 A 12/1997 Chwastiak et al.

FOREIGN PATENT DOCUMENTS

CN 109958724 A 7/2019
JP 58219241 A * 12/1983
(Continued)

OTHER PUBLICATIONS

Suzuki et al. (JP H09-89023 A), Mar. 31, 1997 (EPO—machine translation to English). (Year: 1997).*
(Continued)

*Primary Examiner* — Donald M Flores, Jr.
(74) *Attorney, Agent, or Firm* — Apex Juris, pllc; Tracy M Heims (57) ABSTRACT

[Object]
To provide the disc brake pad including the friction material having the friction surface with the scorch treatment that can provide sufficient braking effectiveness while preventing the fading phenomenon at the initial stage of the disc brake pad usage.
[Means to Resolve]
In the disc brake pad including the friction material having the friction surface with the heat history due to the scorch treatment, the friction surface has the mixed areas including the area with the large heat history of the scorch treatment and the area with relatively small heat history of the scorch treatment. The following formula needs to be satisfied where the reduction rate of the mass of the inside of the friction material without the heat history due to the scorch treatment when performing the thermogravimetric analysis of the friction material at 500 centigrade is A, the reduction rate of the mass of the friction surface area with the largest heat history due to the scorch treatment when performing the thermogravimetric analysis at 500 centigrade is B1, and the reduction rate of the mass of the friction surface area with (Continued)

the relatively small heat history due to the scorch treatment relative to the friction surface area with the largest heat history when performing the thermogravimetric analysis at 500 centigrade is B2.

$$30 \leq B1/A \times 100 \leq 90$$

$$50 \leq B2/A \times 100$$

$$B2/A \times 100 - B1/A \times 100 \leq 60 \quad \text{Formula:}$$

3 Claims, 5 Drawing Sheets

(56) References Cited

FOREIGN PATENT DOCUMENTS

| JP | 1983219241 | A |   | 12/1983 |
| JP | 09089023 | A | * | 3/1997 |
| JP | 199789023 | A |   | 3/1997 |
| JP | 1997-136971 |   |   | 5/1997 |
| JP | 1997136971 | A |   | 5/1997 |
| JP | 1998-318307 |   |   | 12/1998 |
| JP | 1998318307 | A |   | 12/1998 |
| JP | 2002294548 | A |   | 10/2002 |
| JP | 2015026823 | A |   | 2/2015 |
| KR | 20030081918 | A |   | 10/2003 |

OTHER PUBLICATIONS

Fukuoka et al. (JP S58-219241 A), Dec. 20, 1983 (EPO—machine translation to English). (Year: 1983).*
Search report issued on Oct. 12, 2023 by European Patent Office.
Search report issued on Nov. 24, 2023 by China Patent Office.
Search report issued on Apr. 9, 2024 by China Patent Office.
Office action issued on Aug. 10, 2024 by China Patent Office.

* cited by examiner

DISC BRAKE PAD

FIELD OF INVENTION

This invention relates to a disc brake pad used for an automobile disc brake such as a passenger car and a truck and especially relates to a disc brake pad including a friction material having a scorch-treated friction surface.

BACKGROUND OF INVENTION

Conventionally, a disc brake is used for a brake device for an automobile. The disc brake includes a disc brake pad, which is integrated by affixing to a back plate, functioning as the friction material.

A friction material for a disc brake pad is manufactured by performing a mixing step to obtain a raw friction material mixture by mixing a friction material composition including such as a binder, a fiber base, a lubricant, an organic friction modifier, an inorganic friction modifier, a pH adjuster, and a filler, a heat press forming step for heat-press-forming the raw friction material mixture superposed on a back plate, and a curing step for completing the curing reaction of the resin, which is functioning as the binder.

The disc brake pad is used in combination with a cast iron disc rotor as a mating member to effectuate a braking force by pressing the friction material of the disc brake pad against the disc rotor while rotating.

Generally, if a driver applies a brake continuously, a reduction of a braking effectiveness so called fading phenomenon occurs.

This fading phenomenon causes the reduction of the braking effectiveness because a gas or liquid decomposition product is generated when organic substances such as the binder and the organic friction modifier contained in the friction material of the disc brake pad are exposed to a high temperature and high load condition and are thermally decomposed to be positioned between the friction material and the friction surface of the disc rotor ultimately affecting as a lubricant.

In order to prevent the fading phenomenon at an initial stage of the friction material usage, it is known to use a scorch treatment that uses such as a heating plate, flame throw and laser irradiation to perform a high temperature heat treatment on the friction surface of the friction material and burns to remove the organic substances, which may be the cause of generating the fading phenomenon.

Patent Document 1 discloses a manufacturing method for a friction material which is characterized in performing a scorch treatment on an area other than an area from 1 mm at the shortest to 10 mm at the longest both from the outer circumference of the friction material and a manufacturing method for the friction material which is characterized in re-performing the scorch treatment on the area other than the area from 1 mm at the shortest to 10 mm at the longest both from the outer circumference of the friction material after performing the scorch treatment on the whole friction surface area.

According to Patent Document 1, the braking effectiveness at the outer circumferential area of the friction material may be improved by inhibiting the decomposition of the substances such as the thermosetting resin and the organic reinforcement fiber when fading without reducing a friction coefficient and a wear resistance; however, a problem remains as a sufficient braking effectiveness may not be secured at the normally used area of the friction material.

Patent Document 2 uses a disc brake pad that generates a braking force by frictionally contacting the friction material with the disc rotor and discloses the disc brake pad with the scorch treatment on at least one of both sides of the friction material relative to a rotational direction of the disc rotor.

According to Patent Document 2, generation of the braking noise may be inhibited by changing physical characteristics, such as the reduction of the friction coefficient, a reduction of the hardness, a reduction of a strength, and an improvement of hydrophobicity, of the friction material at least one of both sides of the friction material relative to the rotational direction of the disc rotor; however, a problem remains as the fading phenomenon may not be effectively prevented because no scorch treatment is performed on a central area of the friction surface of the friction material.

On the other hand, a cashew dust is used as an organic friction modifier in friction material of the disc brake pad. The cashew dust forms a film on the friction surface of the disc rotor and functions to provide an excellent and stable braking effectiveness as generating an adhesive friction between the disc brake pad and the friction surface.

The scorch treatment may be performed on the friction surface of the friction material to effectively inhibit the fading phenomenon at the initial stage of the disc brake pad usage as burning and removing the organic substances such as the cashew dust that could be the cause of the generation of the fading phenomenon; however, the problem of insufficient braking effectiveness remains because the film of the cashew dust cannot be formed on the friction surface of the disc rotor after the component of the cashew dust on the friction surface of the friction material is burned and ceases to exist.

PRIOR ARTS

Patent Documents

[Patent Document 1] Japanese Provisional Patent Publication No. 1997-136971

[Patent Document 2] Japanese Provisional Patent Publication No. 1998-318307

SUMMARY OF INVENTION

Problems to be Resolved by the Invention

This invention was made to improve the above-problems and to provide a disc brake pad for the use of a disc brake for an automobile, which includes a friction material having a friction material surface on which a scorch treatment is performed. An object of this invention is to provide the disc brake pad that achieves a sufficient braking effectiveness and prevents fading phenomenon at an initial stage of the disc brake pad usage.

Means to Resolve the Problems

Conventional scorch treatments perform a high temperature heat treatment on the friction surface of the friction material to provide a uniform heat history so that a depth of a scorch treatment layer after burning and removing the organic substances becomes uniform from the friction surface.

Applicant completed this invention after confirming the prevention of the fading phenomenon at the initial stage of the disc brake pad usage and the maintenance of the sufficient braking effect by arranging areas of the friction surface to receive different heat histories due to the scorch treatment and by mixing an area within the friction surface where the organic substances such as the cashew dust are removed and an area of the friction surface where relatively large amount of the organic substances such as the cashew dust remains therein.

This invention relates to the disc brake pad for the use of automobiles such as a passenger vehicle and a truck, more particularly to the disc brake pad having the friction material with the friction surface on which the scorch treatment is performed and relates to the invention based on the following technology.

(1) The disc brake pad including the friction material having the friction surface with the heat history due to the scorch treatment, in which the area with the large heat history and an area with relatively small heat history both by the scorch treatment are arranged so as to be mixed on the friction surface.

(2) The disc brake pad according to the above-(1) that satisfies the following Formula 1 where:

"A" represents the reduction rate of a mass of an inside of the friction material with no heat history due to the scorch treatment when performing a thermogravimetric analysis at 500 centigrade, "B1" represents reduction rate of a mass of the friction surface area with the largest heat history due to the scorch treatment when performing the thermogravimetric analysis at 500 centigrade, and "B2" represents the reduction rate of a mass of the friction surface area with a relatively small heat history due to the scorch treatment relative to the friction surface area with the largest heat history when performing the thermogravimetric analysis at 500 centigrade.

[Equation 1]

$$30 \leq B1/A \times 100 \leq 90$$

$$50 \leq B2/A \times 100$$

$$B2/A \times 100 - B1/A \times 100 \leq 60 \qquad \text{Formula 1:}$$

(3) The disc brake pad according to the above-(2), in which 10-90% of the friction surface of the friction material is scorch-treated so as to be an area with the largest heat history due to the scorch treatment The disc brake pad of this invention can effectively prevent the fading phenomenon at the initial stage of the disc brake pad usage by performing the scorch treatment on the friction surface of the friction material and partially removing the organic substances such as the cashew dust existing in the vicinity of the friction surface of the friction material.

Also, the friction material of the disc brake pad according to this invention has the friction surface on which the area with large heat history and the area with relatively small heat history both by the scorch treatment are arranged so as to mixed.

The organic substances such as the cashew dust are removed in the area of the friction surface with the large heat history of the scorch treatment, while relatively large amount of the organic substances such as the cashew dust remains in the area of the friction surface with relatively small heat history of the scorch treatment.

Accordingly, the cashew dust film may be formed on the friction surface of the disc rotor so that an excellent and stable braking effectiveness can be provided because of the generated adhesive friction of the friction surface.

Advantages of the Invention

This invention may provide the disc brake pad that while preventing the fading phenomenon at the initial stage of the disc brake pad usage, can provide sufficient braking effectiveness.

EMBODIMENTS OF THE INVENTION

Figure 1:
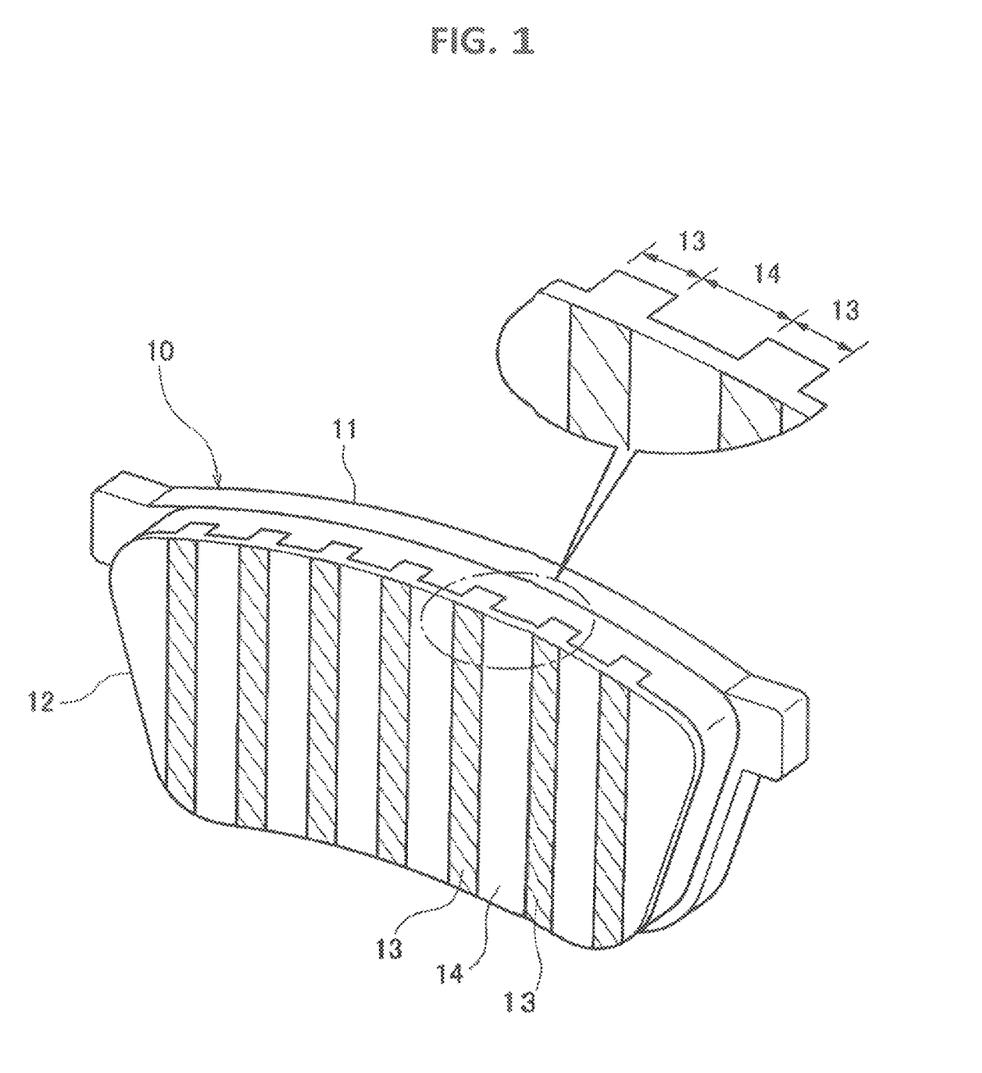
FIG. 1 is a perspective view of an entire disc brake pad of this invention.

The disc brake pad of this invention is explained while referring to FIG. 1.

(1) Disc Brake Pad

A disc brake pad 10 has a metal back plate 11 and a friction material 12 integrally affixed to one side of the back plate 11.

In this invention, a friction surface of the friction material is arranged so that heat histories that the friction surface of the friction material receives due to a scorch treatment are not uniform and an area with large heat history and an area with relatively small heat history both due to scorch treatment are arranged so as to be mixed on the friction surface.

(2) Scorch Treatment

In the later descried manufacturing process, the scorch treatment is performed on the friction material 12 in a way to create different heat histories on the friction surface of the friction material, so that the large heat history of the scorch treatment (intensive treatment area) 13 and an area with relatively small heat history of the scorch treatment (mild treatment area) 14 are arranged so as to be mixed on the friction surface of the friction material.

Organic substances such as a cashew dust in a surface layer of the friction material are burned and ceased to exist in the intensive treatment area 13 with large heat history of the scorch treatment on the friction surface, while relatively large amount of the organic substances such as the cashew dust remains in the mild treatment area 14 with relatively small heat history of the scorch treatment on the friction surface comparing to the intensive treatment area 13 with large history of the scorch treatment on the friction material.

Here in this invention, the mild treatment area 14 with relatively small heat history of the scorch treatment can be an area of the friction surface without the heat history of the scorch treatment.

(3) Reason for Arrangement of Surface Areas with Different Heat Histories of the Scorch Treatment on the Friction Surface of the Friction Material In this invention, the heat histories by the scorch treatment on the friction surface of the friction material 12 are arranged so that the heat histories on the friction surface are not uniform and different heat histories of the scorch treatment are arranged so as to be mixed on the friction surface of the friction material 12.

The reason for arranging the areas having the difference heat histories so as to be mixed on the friction surface of the friction material 12 is to create differences in the amount of the organic substances such as the cashew dust remaining in different areas of the friction surface of the friction material 12 and use the differences to obtain the sufficient braking effectiveness while preventing the fading phenomenon at the initial stage of the usage of a disc brake pad 10.

(3.1) Fading Resistance

The scorch treatment is performed on the friction surface of the friction material 12, and the organic substances such as the cashew dust existing in the vicinity of the friction surface are partially removed, so that the fading phenomenon at the initial stage of the usage of the disc brake pad 10 can effectively be prevented.

(3.2) Braking Effectiveness

The friction material 12 of the disc brake pad 10 of this invention has the intensive treatment area 13 with large heat history of the scorch treatment and the mild treatment area 14 with relatively small heat history of the scorch treatment comparing to the intensive treatment area 13 with large heat history of the scorch treatment.

Relatively larger amount of the organic substances such as the cashew dust remains in the mild treatment area 14 with relatively small heat history of the scorch treatment than the intensive treatment area 13 with large heat history of the scorch treatment.

Therefore, the cashew dust film can be formed on the friction surface of the disc rotor during the braking action, thereby generating the adhesive friction to provide the excellent and stable braking effectiveness.

Method for Manufacturing Disc Brake Pad

Figure 2:
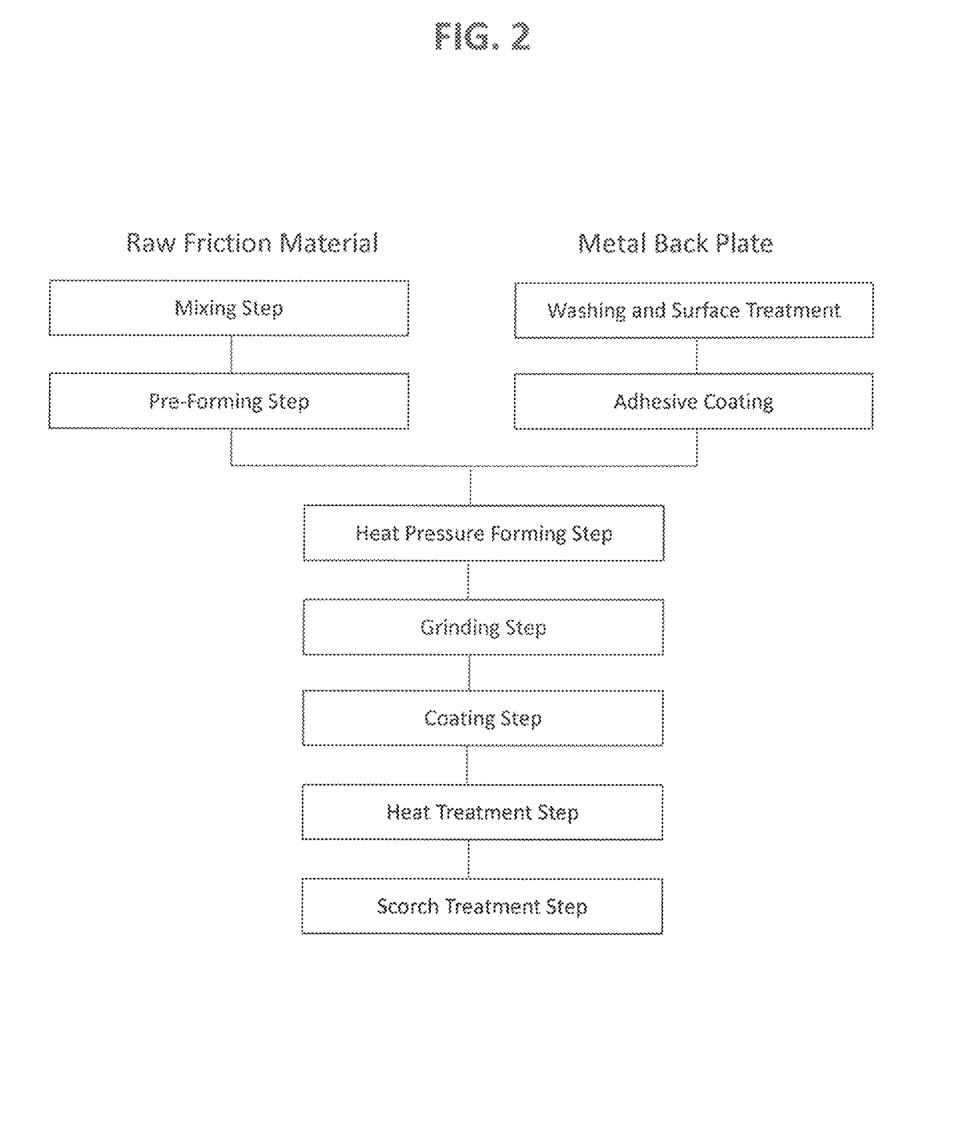
FIG. 2 is a flow chart showing an example of the method of manufacturing the disc brake pad.

The method for manufacturing the disc brake pad is explained with reference to FIG. 2 and FIG. 3.

(1) Mixing Step

A friction material composition containing the predetermined amount of raw friction materials such as a binder, a fiber base, a lubricant, an organic friction modifier, an inorganic friction modifier, a pH adjuster, and a filler, is positioned in a mixer such as Loedige mixer and Eirich mixer to agitate the friction material composition until the friction material composition is uniformly dispersed to obtain a raw friction material mixture.

(2) Pre-Forming Step

The obtained raw friction material mixture is positioned in a preforming die, and a pressing apparatus is used to press-form the raw friction material mixture to obtain an intermediate molded article.

In addition, prior to the pre-forming step, it is an option to add a kneading step to knead the raw friction material mixture by a pressure kneader before the pre-forming step to obtain a kneaded substance of the raw friction material and a granulating step to granulate the raw friction material mixture to obtain a granulated substance of the raw friction material.

(3) Heat Press Forming Step

The intermediate molded article obtained through the pre-forming step is superposed on a pre-washed, pre-surface treated, and adhesive-coated steel back plate to be positioned in a heat forming die and to be heat-press-formed using the pressing apparatus at the temperature of 140-200 centigrade under the pressure of 20-80 MPa for 1-10 minutes to obtain the molded article of the friction material.

Here, the pre-forming step may be omitted, and any one of the raw friction material mixture, the kneaded substance of the raw friction material, or the granulated substance of the raw friction material may be position to process the heat press forming.

(4) Grinding Step and Other Processing Steps

A grinder with a grinding stone may be used to grind the surface of the friction material to form the friction surface.

As necessary, a chamfer or a slit may be formed on the surface of the friction material.

(5) Coating Step

A coating step is performed by coating areas other than the friction surface of the friction material of the disc brake pad by a spray coating or an electrostatic powder coating. A baking is conducted in a next heat treatment step.

(6) Heat Treatment Step

The coated molded article is heated at 180-250 centigrade for 1-5 hours to complete curing of a thermosetting resin contained in the friction material as the binder and at the same time the coating formed during the coating step is baked.

(7) Scorch Treatment Step

To explain the present invention referring to FIG. 3, a vertical cavity surface emitting laser module 20 (hereinafter, surface emitting laser module 20), which is one type of semiconductor lasers, is used as a heating means for the scorch treatment of the friction material 12 formed on one side of the back plate 11, and multiple lasers with different energy densities irradiate the friction surface of the friction material 12, while the surface emitting laser module 20 and the disc brake pad 10 are relatively making a parallel movement, in order to form the friction surface having mixed areas including the area with large heat history of the scorch treatment 13 and the area with relatively small heat history of the scorch treatment 14 comparing to the area with large heat history of the scorch treatment 13.

The scorch treatment is explained in the following sections.

(7.1) Surface Emitting Laser Module (VCSEL Module)

The surface emitting laser module 20 is a module on which multiple vertical cavity surface emitting laser (VCSE) elements 21 (hereinafter surface emitting laser element 21)

are arranged, and the respective surface emitting laser element 21 is capable of changing an energy density of the laser.

The respective surface emitting laser element 21 arranged to face each other on the surface of the friction material 12 is preset to arrange the energy density to provide the heat history of the scorch treatment correspond to the area of the friction surface of the friction material 12, which facilitates forming of the friction surface with the mixed areas including the area with large heat history of the scorch treatment 13 and the area with relatively small heat history of the scorch treatment 14 comparing to the area with large heat history of the scorch treatment 13.

As the surface emitting laser module 20, Vertical Cavity Surface Emitting Laser Module by Philips Photonics Company Limited, which is manufactured such as by the method disclosed in the Japanese Patent Publication No. 2015-51027, may be used. However, the surface emitting laser element 21 is not limited to the one for the vertical cavity surface emitting laser.

(7.2) Laser Density

The energy density for forming the area with large heat history of the scorch treatment 13 is 150-1100 kW/m2, and the energy density of the area with relatively small heat history of the scorch treatment 14 comparing to the area with large heat history of the scorch treatment 13 is 0-300 kW/m2.

(7.3) Irradiation Distance

A distance (hereinafter irradiation distance) G between an irradiation surface of the surface emitting laser element 21 when performing the scorch treatment of the friction material 12 and the surface of the friction material 12 is 15-300 mm and is preferably 30-200 mm but more preferably 50-100 mm.

(7.4) Processing Time

A processing time for the scorch treatment of the friction material 12 is 0.5-60 seconds and is preferably 3-10 but more preferably 4-8 seconds.

If the processing time for the scorch treatment exceeds 60 seconds, the organic substances on the friction material surface are excessively burned, which significantly reduces the strength of the friction material.

(7.5) Arrangement of the Surface Emitting Laser

Figure 3:
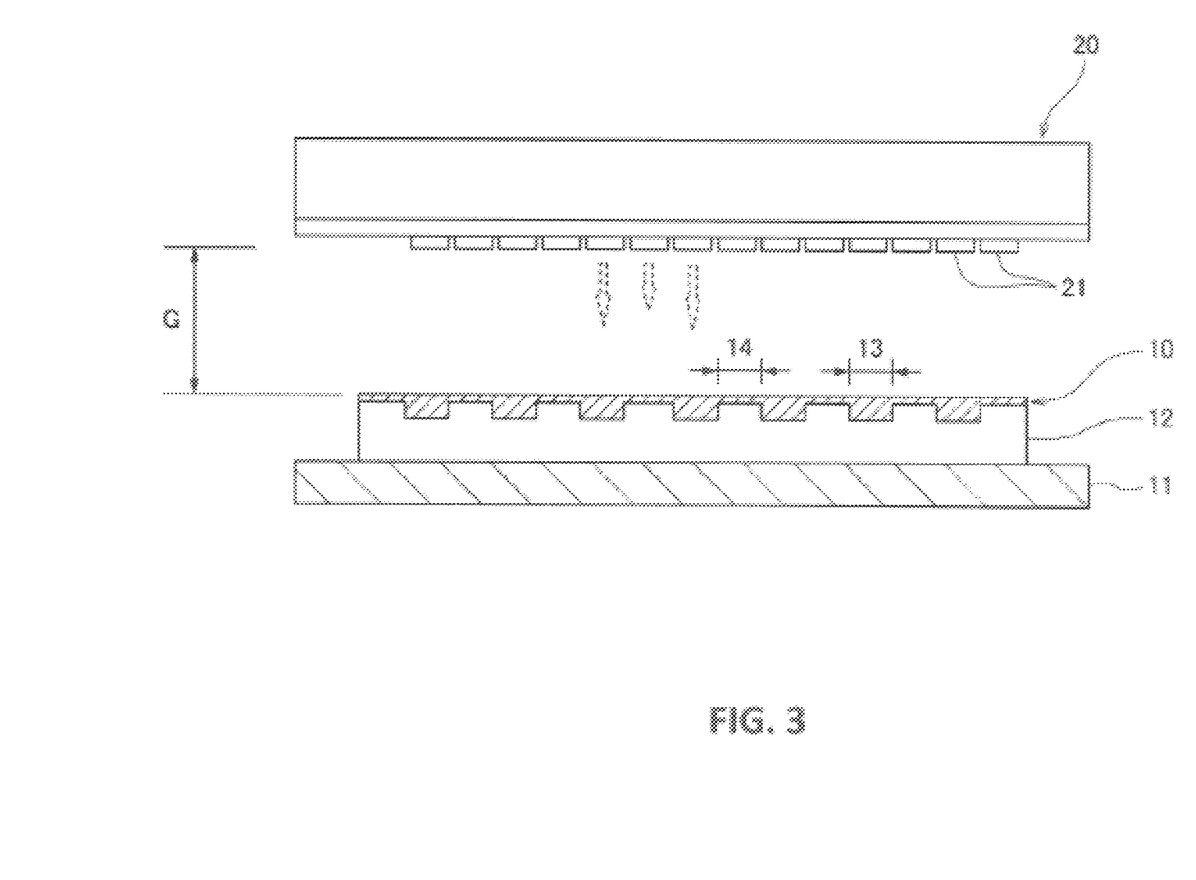
FIG. 3 is a cross section view of the disc brake pad in the process of performing the scorch treatment using a surface emitting laser module.

Positions of the surface emitting laser modules 20 relative to the friction material 12 are not limited to the positions in FIG. 3 showing the surface emitting laser module 20 arranged laterally and parallel to the disc brake pad 10. Positions of the surface emitting laser modules 20 may be arranged vertically facing each other on the friction material 12 or may be arranged widening toward the posterior ends to surround the friction material 12.

(7.6) Surface Pattern (Surface Form) of Scorch Treatment Layer

Either one of the surface emitting laser module 20 or the disc brake pad 10 makes a parallel movement or both of the surface emitting laser module 20 and the disc brake pad 10 make a parallel movement to form the friction surface having the mixed areas including the area with large heat history of the scorch treatment 13 and the area with relatively small heat history of the scorch treatment 14 comparing to the area with large heat history of the scorch treatment 13.

Figure 4A:
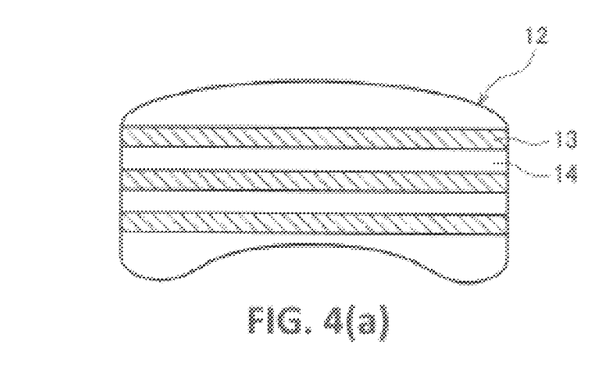
FIG. 4 is an explanatory view of a planar pattern of a scorch treatment layer viewing from a friction surface side of the friction material.
Figure 4B:
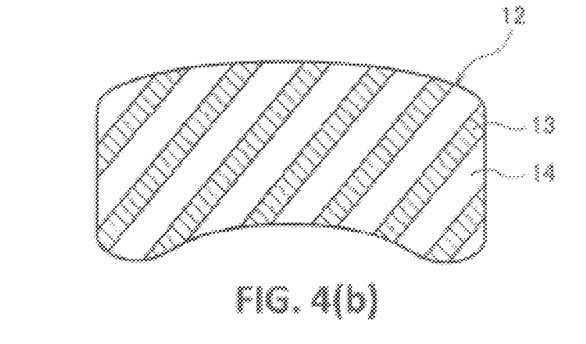
Figure 4C:
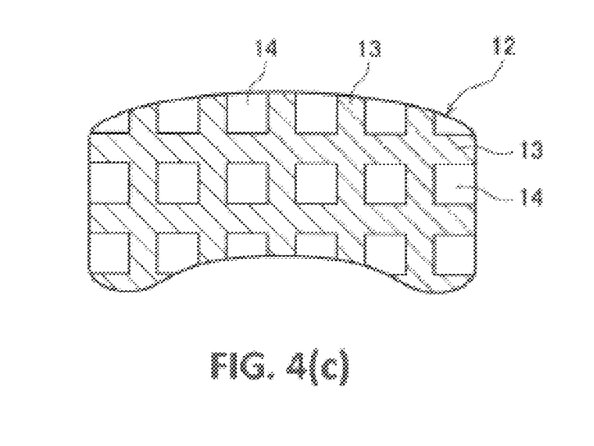
Figure 4D:
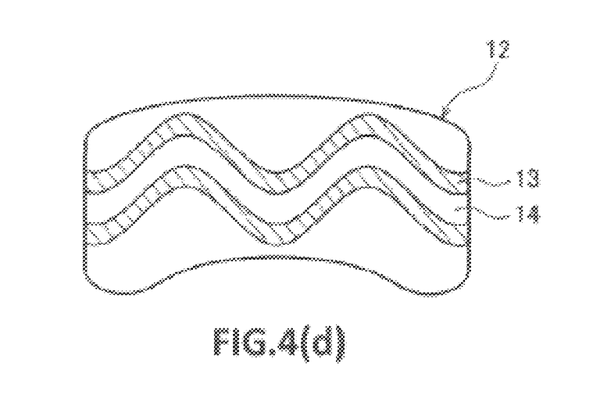

The surface pattern of the area with large heat history of the scorch treatment 13 viewing from the friction surface side of the friction material 12 is not limited to the stripe pattern in a vertical direction of the friction material 12 as shown in FIG. 1. For example, the pattern may be one pattern or any combination of the patterns as shown in FIG. 4 such as a stripe pattern in a horizontal direction of the friction material 12 as shown in FIG. 4(a), an oblique stripe pattern as shown in FIG. 4(b), a lattice pattern as shown in FIG. 4(c), and a wave pattern as shown in FIG. 4(d), and the houndstooth pattern.

Furthermore, the surface form of the area with large heat history of the scorch treatment 13 is not limited to a straight shape and can be a curve shape.

In addition, the surface form of the area with large heat history of the scorch treatment 13 is not limited to a continuous strip surface but can be a broken strip surface having gaps therebetween and a polka-dot strip surface having a polka-dot pattern.

A width of the area with large heat history of the scorch treatment 13 and a spacing or an interval between the areas with large heat history of the scorch treatment 13 are determined as appropriate.

As already explained above, this invention facilitates manufacturing of the disc brake pad 10 having the friction material 12 with the mixed areas including areas of different heat histories of the scorch treatment by irradiating the friction surface of the friction material 12 using multiple lasers with different energy densities while relatively moving the surface emitting laser module 20 and the disc brake pad 10.

Determination of Amount of Heat History Being Large or Small

Figure 5:
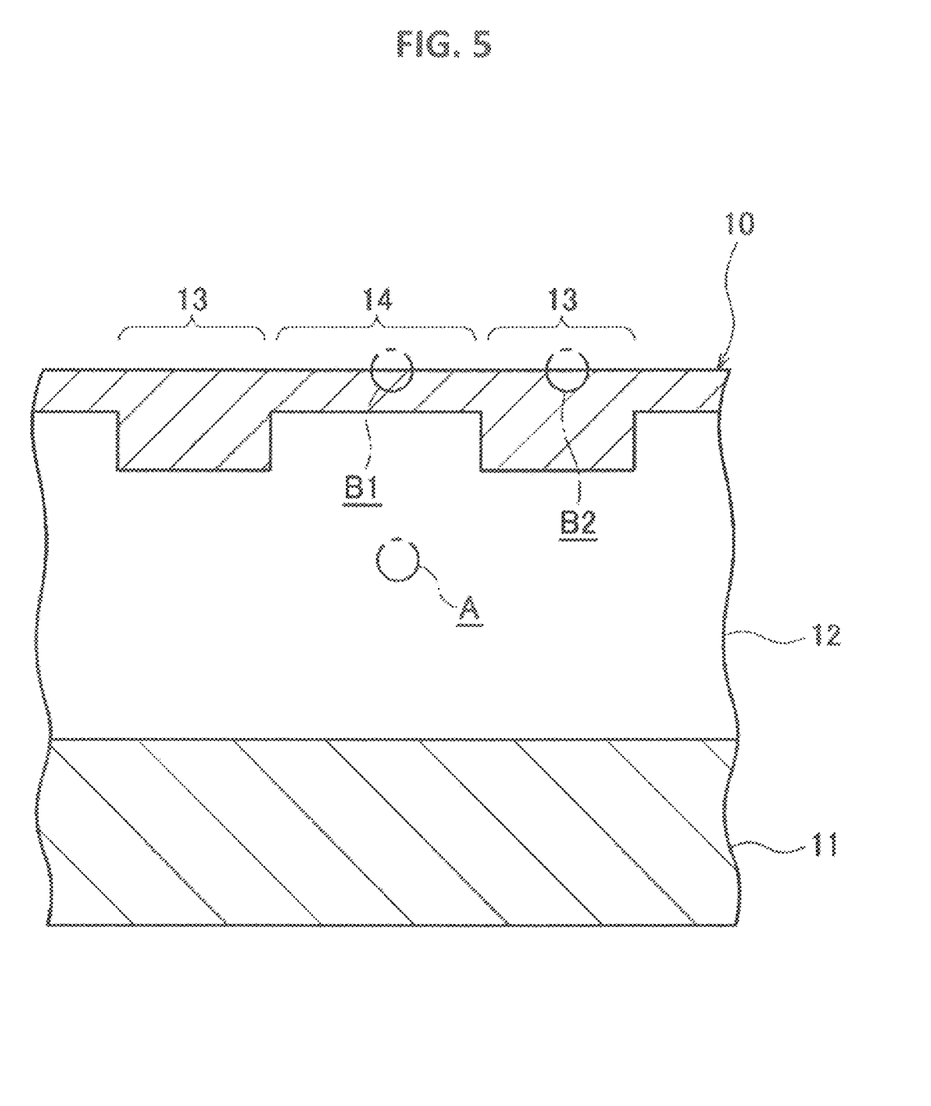
FIG. 5 is an enlarged partial cross section view of disc brake pad after the scorch treatment.

With reference to FIG. 5, a process of determining the amount of the heat history of the friction material 12 due to the scorch treatment is explained.

In this invention, as a process of determining the amount of the heat history of the friction material 12 due to the scorch treatment, Thermogravimetric Analysis or Thermal Gravimetric Analysis (TGA) is utilized.

(1) Determination Principle of Heat History

Whether the heat history of the particular area of the friction material 12 due to the scorch treatment is large or small can be determined from the mass reduction rate as the result of thermogravimetric analysis using the surface specimen collected from the surface of the friction material 12 with the heat history of the scorch treatment and the internal specimen collected from the inside of the friction material 12 without the heat history of the scorch treatment.

(1.1) Method of Collecting Specimen of Friction Material Surface

A drilling machine is used to drill a hole with a diameter of 6 mm and a depth of 0.1 mm in two portions of each of the area with large heat history of the scorch treatment 13 and the area with relatively small heat history of the scorch treatment 14 comparing to the area with large heat history of the scorch treatment 13 in order to collect 20 mg of specimen from each hole.

(1.2) Method of Collecting Specimen of Inside of Friction Material

A grinding machine is used to grind from the surface of the friction material 12 with the heat history due to the scorch treatment to the surface of the friction material 12 without the heat history of the scorch treatment, which is 3 mm depth.

Then, the drilling machine is used to drill a hole with a diameter of 6 mm and a depth of 0.1 mm in order to collect 20 mg of the internal specimen.

(1.3) Definition of Mass Reduction Rate

Prior to the thermogravimetric analysis of the specimens (the surface specimen and internal specimen) collected from the friction material 12, the mass reduction rate of the respective specimen is defined as follows.

| | |
|---|---|
| A(%) | A reduction rate of the mass of the inside of the friction material without the heat history due to the scorch treatment when performing the thermogravimetric analysis of the friction material at 500 centigrade |
| B1(%) | A reduction rate of the mass of the friction surface area with the largest heat history due to the scorch treatment 13 when performing the thermogravimetric analysis at 500 centigrade. |
| B2(%) | A reduction rate of the mass of the friction surface area with the relatively small heat history due to the scorch treatment 14 relative to the friction surface area with the largest heat history due to the scorch treatment 13 when performing the thermogravimetric analysis at 500 centigrade. |

The reduction rate of the mass of the friction surface when performing the thermogravimetric analysis of the respective specimen collected from the friction material 12 is as follows.

With respect to the internal portion of the friction material 12 without the heat history due to the scorch treatment, because no organic substances such as the cashew dust are not removed, the reduction rate A of the mass when conducting the thermogravimetric analysis is the largest among all.

With respect to the area with the largest heat history due to the scorch treatment 13 on the friction surface 12, because the largest amount of the organic substances such as the cashew dust is removed, the reduction rate B1 of the mass when conducing the thermogravimetric analysis is the smallest among all.

With respect to the area with relatively small heat history due to the scorch treatment 14 on the friction surface relative to the area with the largest heat history due to the scorch treatment 13 on the friction surface 12, because the amount of the organic substances such as the cashew dust removed is relatively small, the reduction rate B2 of the mass when conducting the thermogravimetric analysis is larger than the reduction rate B1.

In addition, when the scorch treatment is not performed on the area with relatively small heat history due to the scorch treatment 14, the reduction rate B2 of the mass when conducting the thermogravimetric analysis of the surface of the friction material 12 becomes approximately equal to the reduction rate A of the mass of the internal portion of the friction material 12.

In consideration of the above-discussion, the relation of the reduction rate of the mass when conducting the thermogravimetric analysis at 500 centigrade on the friction material surface is $A \geq B2 > B1$.

(1.4) Relational Expression of Mass Reduction Rate

Whether the heat history due to the scorch treatment of the friction material 12 is large or small is adjusted to satisfy the following formula in consideration of the mass reduction rate based on the thermogravimetric analysis using the surface specimen of the friction material 12 and the internal specimen of the friction 12 without the heat history due to the scorch treatment.

By satisfying the following formula, while preventing the fading phenomenon at the initial stage of the usage of the disc brake pad 10, the sufficient braking effectiveness can be obtained.

Also, in the case of not satisfying the following formula, in addition to not being able to obtain the above-advantage, problems of reducing the wear resistance and flatness of the friction surface exist.

[Equation 2]

Formula 1:

$$30 \leq B1/A \times 100 \leq 90 \tag{A}$$

$$50 \leq B2/A \times 100 \tag{B}$$

$$B2/A \times 100 - B1/A \times 100 \leq 60 \tag{C}$$

(2) Area Ratio of Area with the Largest Heat History Due to Scorch Treatment In this invention, while satisfying the above-Formula 1, the area ratio of the area with the largest heat history due to the scorch treatment 13 in the friction surface of the friction material 12 is set to be within the rage of 10-90%.

The area ratio of the area with the largest heat history due to the scorch treatment 13 is preferably within the range of 30-70% and is more preferably within the range of 40-60%. By setting the area ratio of the area with the largest heat history due to the scorch treatment 13, the fading resistance and the braking effectiveness can be improved.

(3) Thermogravimetric Analysis

The thermogravimetric analysis is conducted by Thermo plus EVO TG8120 by Rigaku Company Limited under the following conditions. A thermogravimetric reduction rate is calculated from the thermogravimetric reduction amount between the room temperature to 500 centigrade.

| | |
|---|---|
| Atmosphere | Air |
| Amount of Specimen | 10 mg |
| Standard Specimen | α alumina |
| Measuring Temperature | Between room temperature and 800 centigrade |
| Temperature Elevation Rate | 20 centigrade per minute |

EMBODIMENTS

In the following sections, embodiments and comparative examples of this invention are concretely explained; however, this invention is not limited to the following embodiments.

1. Manufacturing Method for Disc Brake Pad in Embodiments 1-26 and Comparative Examples 1-9

The friction material composition with compositions as shown in Table 1 is mixed by Loedige mixer for 5 minutes, and the mixed friction material composition is pressed in the pre-forming die under the pressure of 30 MPa for 10 seconds to obtain the intermediate molded article. This intermediate molded article is superposed on the pre-washed, surface treated, and adhesive coated steel back plate to be positioned in the heat forming die together with the back plate to be heat-pressed at the temperature of 150 centigrade under the pressure of 40 MPa for 10 minutes and is electrostatic powder coated to be heat-treated (post-cured) and baked at the temperature of 200 centigrade for 5 hours to be grinded to form the friction surface.

TABLE 1

| | | |
|---|---|---|
| Binder | Phenol Resin | 12 |
| Fiber Base | Aramid Fiber | 4 |
| Lubricant | Zinc Sulfide | 2 |
| | Artificial Graphite | 3 |
| | Petroleum Coke | 3 |
| Inorganic Friction Modifier | Plate Like Potassium Hexatitanate | 20 |
| | Zirconium Silicate | 2 |
| | Mica | 3 |
| | Zirconium Oxide | 20 |
| Organic Friction Modifier | Cashew Dust | 5 |
| | Tire Tread Rubber Pulverized Powder | 4 |
| pH Adjuster | Calcium Hydroxide | 3 |
| Filler | Barium Sulfide | 19 |
| Total (Weight %) | | 100 |

Disc brake pads are manufactured by performing the scorch treatment under the conditions in the following Table 2 and Table 3 (Embodiments 1-26, Comparative Examples 1-9)

TABLE 2

| | | Embodiments | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Area with Largest Heat History due to Scorch Treatment Conditions for Scorch Treatment (Area B1) | Energy Density of Surface Emitting Laser Element (kW/m2) | 160 | 630 | 960 | 300 | 600 | 900 | 1100 | 400 | 700 | 1000 | 1100 | 500 | 700 |
| | Distance between Irradiation Surface of Surface Emitting Laser Element and Friction Material Surface (mm) | 50 | 50 | 50 | 50 | 50 | 50 | 50 | 50 | 50 | 50 | 50 | 50 | 50 |
| | Processing Time for Scorching Treatment (seconds) | 5 | 5 | 5 | 5 | 5 | 5 | 5 | 5 | 5 | 5 | 5 | 5 | 5 |
| Area with Relatively Smaller Heat History due to Scorch Treatment Comparing to Area with Largest Heat History due to Scorch Treatment Conditions for Scorch Treatment (Area B2) | Energy Density of Surface Emitting Laser Element (kW/m2) | 0 | 0 | 0 | 70 | 70 | 70 | 70 | 110 | 110 | 110 | 110 | 150 | 150 |
| | Distance between Irradiation Surface of Surface Emitting Laser Element and Friction Material Surface (mm) | 50 | 50 | 50 | 50 | 50 | 50 | 50 | 50 | 50 | 50 | 50 | 50 | 50 |
| | Processing Time for Scorching Treatment (seconds) | 5 | 5 | 5 | 5 | 5 | 5 | 5 | 5 | 5 | 5 | 5 | 5 | 5 |
| A | | 13.2 | 13.1 | 13.3 | 13.2 | 13.1 | 13.0 | 12.9 | 12.9 | 13.3 | 13.0 | 12.8 | 13.2 | 13.0 |
| B1 | | 11.7 | 7.9 | 5.2 | 10.8 | 8.1 | 5.8 | 4.4 | 9.8 | 7.1 | 5.3 | 4.0 | 9.0 | 7.2 |
| B2 | | 13.1 | 12.9 | 13.0 | 12.1 | 12.3 | 12.1 | 12.0 | 10.9 | 11.3 | 11.1 | 11.0 | 9.8 | 10.1 |
| B1/A × 100 | | 88.6 | 60.3 | 39.1 | 81.8 | 61.8 | 44.6 | 34.1 | 76.0 | 53.4 | 40.8 | 31.3 | 68.2 | 55.4 |
| B2/A × 100 | | 99.2 | 98.5 | 97.7 | 91.7 | 93.9 | 93.1 | 93.0 | 84.5 | 85.0 | 85.4 | 85.9 | 74.2 | 77.7 |
| B2/A × 100 − B1/A × 100 | | 10.6 | 38.2 | 58.6 | 9.8 | 32.1 | 48.5 | 58.9 | 8.5 | 31.6 | 44.6 | 54.7 | 6.1 | 22.3 |
| B1 Area Ratio (%) | | 50 | 50 | 50 | 50 | 50 | 50 | 50 | 50 | 50 | 50 | 50 | 50 | 50 |

| | | Embodiments | | | | | | | | | | | | |
|---|---|---|---|---|---|---|---|---|---|---|---|---|---|---|
| | | 14 | 15 | 16 | 17 | 18 | 19 | 20 | 21 | 22 | 23 | 24 | 25 | 26 |
| Area with Largest Heat History due to Scorch Treatment Conditions for | Energy Density of Surface Emitting Laser Element (kW/m2) | 1100 | 600 | 1100 | 800 | 1100 | 900 | 1100 | 700 | 700 | 700 | 700 | 700 | 700 |

TABLE 2-continued

| | | | | | | | | | | | | | | |
|---|---|---|---|---|---|---|---|---|---|---|---|---|---|---|
| Scorch Treatment (Area B1) | Distance between Irradiation Surface of Surface Emitting Laser Element and Friction Material Surface (mm) | 50 | 50 | 50 | 50 | 50 | 50 | 50 | 50 | 50 | 50 | 50 | 50 | 50 |
| | Processing Time for Scorching Treatment (seconds) | 5 | 5 | 5 | 5 | 5 | 5 | 5 | 5 | 5 | 5 | 5 | 5 | 5 |
| Area with Relatively Smaller Heat History due to Scorch Treatment Comparing to Area with Largest Heat History due to Scorch Treatment Conditions for Scorch Treatment (Area B2) | Energy Density of Surface Emitting Laser Element (kW/m2) | 150 | 190 | 190 | 220 | 220 | 270 | 270 | 110 | 110 | 110 | 110 | 110 | 110 |
| | Distance between Irradiation Surface of Surface Emitting Laser Element and Friction Material Surface (mm) | 50 | 50 | 50 | 50 | 50 | 50 | 50 | 50 | 50 | 50 | 50 | 50 | 50 |
| | Processing Time for Scorching Treatment (seconds) | 5 | 5 | 5 | 5 | 5 | 5 | 5 | 5 | 5 | 5 | 5 | 5 | 5 |
| A | | 13.3 | 13.3 | 13.1 | 13.2 | 12.9 | 13.1 | 13.2 | 13.1 | 13.2 | 13.0 | 12.9 | 13.0 | 13.3 |
| B1 | | 4.1 | 7.8 | 4.3 | 6.8 | 4.0 | 5.8 | 4.2 | 7.0 | 7.1 | 6.9 | 7.2 | 7.1 | 7.1 |
| B2 | | 9.8 | 9.1 | 9.0 | 8.1 | 8.0 | 6.8 | 7.0 | 11.0 | 11.2 | 10.9 | 11.1 | 11.3 | 11.1 |
| B1/A × 100 | | 30.8 | 58.6 | 32.8 | 51.5 | 31.0 | 44.3 | 31.8 | 53.4 | 53.8 | 53.1 | 55.8 | 54.6 | 53.4 |
| B2/A × 100 | | 73.7 | 68.4 | 68.7 | 61.4 | 62.0 | 51.9 | 53.0 | 84.0 | 84.8 | 83.8 | 86.0 | 86.9 | 83.5 |
| B2/A × 100 − B1/A × 100 | | 42.9 | 9.8 | 35.9 | 9.8 | 31.0 | 7.6 | 21.2 | 30.5 | 31.1 | 30.8 | 30.2 | 32.3 | 30.1 |
| B1 Area Ratio (%) | | 50 | 50 | 50 | 50 | 50 | 50 | 50 | 5 | 10 | 30 | 60 | 90 | 95 |

| | | Comparative Examples | | | | | | | | |
|---|---|---|---|---|---|---|---|---|---|---|
| | | 1 | 2 | 3 | 4 | 5 | 6 | 7 | 8 | 9 |
| Area with Largest Heat History due to Scorch Treatment Conditions for Scorch Treatment (Area B1) | Energy Density of Surface Emitting Laser Element (kW/m2) | 120 | 1000 | 1150 | 1150 | 1150 | 1150 | 1150 | 1150 | 1000 |
| | Distance between Irradiation Surface of Surface Emitting Laser Element and Friction Material Surface (mm) | 50 | 50 | 50 | 50 | 50 | 50 | 50 | 50 | 50 |
| | Processing Time for Scorching Treatment (seconds) | 5 | 5 | 5 | 5 | 5 | 5 | 5 | 5 | 5 |
| Area with Relatively Smaller Heat History due to Scorch Treatment Comparing to Area with Largest Heat History due to Scorch Treatment Conditions for Scorch Treatment (Area B2) | Energy Density of Surface Emitting Laser Element (kW/m2) | 0 | 0 | 70 | 110 | 150 | 190 | 220 | 270 | 290 |
| | Distance between Irradiation Surface of Surface Emitting Laser Element and Friction Material Surface (mm) | 50 | 50 | 50 | 50 | 50 | 50 | 50 | 50 | 50 |
| | Processing Time for Scorching Treatment (seconds) | 5 | 5 | 5 | 5 | 5 | 5 | 5 | 5 | 5 |
| A | | 13.2 | 12.9 | 13.0 | 13.1 | 13.1 | 13.1 | 13.0 | 13.0 | 13.3 |
| B1 | | 12.1 | 4.9 | 3.8 | 3.7 | 3.6 | 3.8 | 3.7 | 3.8 | 4.9 |
| B2 | | 13.1 | 12.8 | 11.8 | 10.8 | 10.0 | 9.2 | 8.3 | 6.9 | 6.5 |
| B1/A × 100 | | 91.7 | 38.0 | 29.2 | 28.2 | 27.5 | 29.0 | 28.5 | 29.2 | 36.8 |
| B2/A × 100 | | 99.2 | 99.2 | 90.8 | 82.4 | 76.3 | 70.2 | 63.8 | 53.1 | 48.9 |
| B2/A × 100 − B1/A × 100 | | 7.6 | 61.2 | 61.5 | 54.2 | 48.9 | 41.2 | 35.4 | 23.8 | 12.0 |
| B1 Area Ratio (%) | | 50 | 50 | 50 | 50 | 50 | 50 | 50 | 50 | 50 |

2. Evaluation Standard

The fading resistance, the braking effectiveness, the wear resistance, and the flatness level are evaluation for the obtained disc brake pads.

<1> Fading Resistance

In conformity to JASO C406, "Passenger Car Brake Dynamo Meter Method", the minimum friction coefficient μ in the first fading test is measured. The evaluation standard is as follows:

| Evaluation | Minimum friction coefficient μ |
|---|---|
| Excellent | 0.30 or more |
| Good | 0.25 or more but less than 0.30 |
| Pass | 0.20 or more but less than 0.25 |
| Fail | Less than 0.20 |

<2> Braking Effectiveness

In conformity to JASO C406, "Passenger Car Brake Dynamo Meter Method", the average friction coefficient μ in the second effect test is measured. The evaluation standard is as follows:

| Evaluation | Average friction coefficient μ |
|---|---|
| Excellent | 0.45 or more |
| Good | 0.42 or more but less than 0.45 |
| Pass | 0.38 or more but less than 0.42 |
| Fail | Less than 0.38 |

<3> Wear Resistance

In conformity to JASO C427, "Automobile Parts-Brake Lining and Disc Brake Pad-Wear Test Procedure on Inertia Dynamometer", the amount of wear of the friction material (shown by millimeter or mm) is measured at the initial speed of braking of 50 km/h and the deceleration speed of braking of 0.3 G with the suitable number of brake actions under the brake temperature before braking of 200 centigrade, and after converting the obtained measurement into the amount of wear at 100 braking time, the value is evaluated under the following evaluation standards.

Evaluation standard is as follows.

| Evaluation | Amount of wear of the friction material (mm) |
|---|---|
| Excellent | Less than 0.15 mm |
| Good | 0.15 mm or more but less than 0.20 mm |
| Pass | 0.20 mm or more but less than 0.50 mm |
| Fail | 0.50 mm or more |

<4> Flatness Level of Friction Surface

Three support blocks are mounted on a surface plate to make uniform in height. These support blocks support three ends of the back plate. A dial gauge is used to measure heights of five areas of the friction material with the largest heat history due to the scorch treatment and five areas of the friction material with relatively small heat history due to the scorch treatment comparing to the areas with the largest heat history due to the scorch treatment to determine the difference between the highest height and lowest height. Evaluation standard is as follows.

| Evaluation | Flatness level of the friction material (μm) |
|---|---|
| Excellent | Less than 70 μm |
| Good | 70 μm or more but less than 100 μm |
| Pass | 100 μm or more but less than 150 μm |
| Fail | 150 μm or more |

3. Evaluation Results

Results of the evaluation are shown in Table 4 and Table 5.

TABLE 4

| | | Embodiments | | | | | | | | | | | | | | | | | | | | | | | | |
|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| Evaluation Results | Fading Resistance | P | G | G | P | G | G | G | G | E | E | G | G | E | G | E | G | E | G | E | G | P | G | E | E | E | E |
| | Braking Effectiveness | E | E | E | E | E | G | G | E | E | G | G | E | E | G | E | G | G | G | G | P | E | E | E | E | G | P |
| | Wear Resistance | E | E | G | E | E | G | P | E | E | G | P | E | G | P | G | P | P | P | P | P | E | E | E | E | G | G |
| | Flatness Level | E | G | P | E | E | G | P | E | E | G | P | E | E | G | E | E | E | E | E | E | E | E | E | E | E | E |

E = Excellent
G = Good
P = Pass
F = Fail

TABLE 5

| | | Comparative Examples | | | | | | | | |
|---|---|---|---|---|---|---|---|---|---|---|
| | | 1 | 2 | 3 | 4 | 5 | 6 | 7 | 8 | 9 |
| Evaluation Results | Fading Resistance | F | G | G | P | P | P | P | P | P |
| | Braking Effectiveness | E | E | G | G | G | P | P | P | F |

TABLE 5-continued

|  | Comparative Examples | | | | | | | | |
|---|---|---|---|---|---|---|---|---|---|
|  | 1 | 2 | 3 | 4 | 5 | 6 | 7 | 8 | 9 |
| Wear Resistance | E | G | P | F | F | F | F | F | P |
| Flatness Level | E | F | F | P | P | G | E | E | E |

From the respective tables, the respective friction material 12 that satisfies the conditions of this invention shows more sufficient and satisfactory evaluation result with respect to the fading resistance, the braking effectiveness, the wear resistance, and flatness level.

INDUSTRIAL APPLICABILITY

According to this invention, in the disc brake pad having the friction material with the friction surface with the heat history due to the scorch treatment, the disc brake pad offers an excellent practical value by providing, while preventing the fading phenomenon at the initial stage of the disc brake pad usage, the sufficient wear resistance and the braking effectiveness.

10. Disc brake pad
11. Back plate
12. Friction material
13. Area with the largest heat history due to scorch treatment
14. Area with relatively small heat history due to scorch treatment comparing to the area with the largest heat history due to scorch treatment
20. Surface emitting laser module
21. Surface emitting laser element

The invention claimed is:

1. A disc brake pad, comprising a friction material having a friction surface with a heat history due to a scorch treatment, wherein
an area with a large heat history and an area with relatively small heat history compared to the area with the large heat history, both by the scorch treatment are arranged so as to be mixed on the friction surface, and the disc brake pad satisfies a following formula:

$30 \leq B1/A \times 100 \leq 90$;

$50 \leq B2/A \times 100$; and $B2/A \times 100 - B1/A \times 100 \leq 60$, where "A" represents a reduction rate of a mass of an inside of the friction material with no heat history due to the scorch treatment when performing a thermogravimetric analysis at 500 centigrade, "B1" represents a reduction rate of a mass of the area of the friction surface with the largest heat history due to the scorch treatment when performing the thermogravimetric analysis at 500 centigrade, and "B2" represents a reduction rate of a mass of the area of the friction surface with the relatively small heat history compared to the area with the large heat history due to the scorch treatment relative to the area of the friction surface area with the largest heat history when performing the thermogravimetric analysis at 500 centigrade.

2. The disc brake pad according to claim 1, wherein 10-90% of an area of the friction surface of the friction material is scorch-treated so as to be an area with the largest heat history due to the scorch treatment.

3. A disc brake pad, comprising a friction material having a friction surface with a heat history due to a scorch treatment, wherein
an area with a large heat history and an area with relatively small heat history compared to the area with the large heat history are present across the entire friction surface,
the scorch treatment is processed on both areas with the large heat history and the relatively small heat history by a surface-emitting laser module to irradiate multiple lasers with varying energy densities onto the friction material surface while parallelly moving either one or both of the surface emitting laser module or a brake pad, and
thermogravimetric analysis (TGA) is used as a measure for controlling or evaluating an effect of scorch treatment on friction materials while defining a presence of varying heat histories.

* * * * *